United States Patent
Kuzma et al.

(10) Patent No.: US 7,420,458 B1
(45) Date of Patent: Sep. 2, 2008

(54) SECONDARY CARD READER

(75) Inventors: Peter J. Kuzma, Richboro, PA (US); Charles A. Eldering, 524 St. Lawrence Way, Furlong, PA (US) 18925; Michael Mauriel, New York, NY (US)

(73) Assignee: Charles A. Eldering, Furlong, PA (US)

( * ) Notice: Subject to any disclaimer, the term of this patent is extended or adjusted under 35 U.S.C. 154(b) by 392 days.

(21) Appl. No.: 11/038,633

(22) Filed: Jan. 19, 2005

Related U.S. Application Data

(60) Provisional application No. 60/537,536, filed on Jan. 20, 2004.

(51) Int. Cl.
*G08B 13/14* (2006.01)

(52) U.S. Cl. ............. 340/10.34; 340/572.1; 340/825.49

(58) Field of Classification Search .............. 340/10.34, 340/572.1, 825.49
See application file for complete search history.

(56) References Cited

U.S. PATENT DOCUMENTS

| | | | |
|---|---|---|---|
| 5,029,183 A * | 7/1991 | Tymes | 375/141 |
| 5,051,741 A * | 9/1991 | Wesby | 340/825.49 |
| 5,144,313 A | 9/1992 | Kirkness | |
| 5,163,004 A | 11/1992 | Rentz | |
| 5,382,784 A | 1/1995 | Eberhardt | |
| 5,455,575 A * | 10/1995 | Schuermann | 342/42 |
| 5,500,651 A | 3/1996 | Schuermann | |
| 5,584,065 A | 12/1996 | Monzello | |
| 5,594,448 A | 1/1997 | d'Hont | |
| 5,619,207 A | 4/1997 | d'Hont | |
| 5,657,317 A | 8/1997 | Mahany et al. | |
| 5,661,457 A | 8/1997 | Ghaffari et al. | |
| 5,708,423 A | 1/1998 | Ghaffari et al. | |
| 5,798,693 A | 8/1998 | Engellenner | |
| 5,929,801 A | 7/1999 | Aslanidis et al. | |
| 5,952,922 A | 9/1999 | Shober | |
| 5,987,011 A | 11/1999 | Toh | |
| 6,046,683 A | 4/2000 | Pidwerbetsky et al. | |
| 6,069,564 A | 5/2000 | Hatano et al. | |
| 6,075,973 A | 6/2000 | Greeff et al. | |
| 6,094,173 A | 7/2000 | Nylander | |
| 6,130,623 A | 10/2000 | MacLellan et al. | |
| 6,150,921 A | 11/2000 | Werb et al. | |
| 6,211,781 B1 | 4/2001 | McDonald | |

(Continued)

OTHER PUBLICATIONS

Hook, C., "The EPC Network, RFID and Data", Uniform Code Council, May 23, 2003.

(Continued)

*Primary Examiner*—Jeff Hofsass
*Assistant Examiner*—Scott Au
(74) *Attorney, Agent, or Firm*—Technology, Patents & Licensing, Inc.

(57) ABSTRACT

A secondary reader and associated system are disclosed. In some embodiments, a secondary reader obtains and communicates information about a reading of an RFID tag by a primary reader by receiving an RFID signal that is responsive to a signal from the primary reader. In some embodiments, the secondary reader also receives an interrogation signal from the primary reader. In some embodiments, the secondary reader receives information related to the primary reader that may, in some instances, include a security key used to determine whether or not the primary reader is authorized to read the RFID tag. Variations on these and other embodiments are described more fully herein.

16 Claims, 5 Drawing Sheets

U.S. PATENT DOCUMENTS

| | | | |
|---|---|---|---|
| 6,226,300 | B1 | 5/2001 | Hush |
| 6,317,028 | B1 | 11/2001 | Valiulis |
| 6,354,493 | B1 | 3/2002 | Mon |
| 6,404,339 | B1 * | 6/2002 | Eberhardt .................. 340/572.1 |
| 6,411,213 | B1 * | 6/2002 | Vega et al. ................ 340/573.3 |
| 6,424,264 | B1 | 7/2002 | Giraldin et al. |
| 6,452,498 | B2 | 9/2002 | Stewart |
| 6,456,239 | B1 | 9/2002 | Werb et al. |
| 6,459,376 | B2 | 10/2002 | Trosper |
| 6,476,756 | B2 | 11/2002 | Landt |
| 6,480,108 | B2 | 11/2002 | McDonald |
| 6,483,427 | B1 | 11/2002 | Werb et al. |
| 6,496,806 | B1 | 12/2002 | Horwitz et al. |
| 6,512,478 | B1 | 1/2003 | Chien |
| 6,539,393 | B1 | 3/2003 | Kabala |
| 6,539,396 | B1 | 3/2003 | Bowman-Amuah |
| 6,557,760 | B2 | 5/2003 | Goodwin, III |
| 6,587,835 | B1 | 7/2003 | Treyz et al. |
| 6,600,443 | B2 | 7/2003 | Landt |
| 6,611,758 | B1 | 8/2003 | Nysen |
| 6,624,752 | B2 | 9/2003 | Klitsgaard et al. |
| 6,640,253 | B2 | 10/2003 | Schaefer |
| 6,657,543 | B1 | 12/2003 | Chung |
| 2006/0047789 | A1 | 3/2006 | Kumar et al. |

OTHER PUBLICATIONS

Finkenzeller, Klaus, "The RFID Handbook",SAW Transponder, 1999, pp. 49 & 101, John J. Wiley & Sons, Inc., New York, NY.

Sun's Auto-ID Architechture, White Paper, Jun. 2003, www.sun.com/software, 10 pages.

Salonen, P. et al, "An Intelligent 2.45 GHz Multidimensional Beam-Scanning X-Array for Modem RFID Reader", Antennas and Propagation Society INternational Symposium, 2000, 1,190-193.

Salonen, P. et al., "A Novel Bluetooth Antenna On Flexible Substrate For Smart Clothing", Systems, Man, and Cybernetics, 2001, 2, 789-794.

Salonen, P, et al., "A 2.45 GHz Digital Beam-Forming Antenna for RFID Reader", Vehicular Technology Conference, 2002, 4, 1766-1770.

Want, R., "RFID-A Key to Automating Everything", Scientific American, Jan. 2004, 56-65.

Scher, B. "Dynasys Gamma Gateway High Frequency RFID Antenna", Tirfid TIRIS Tag-it RFID Tags from Dynasys-Gamma Gateway, Jul. 3, 2003, http://www.rfidusa.com/rfid_gamma_gateway.html, 3 pages.

"Flint Bets on Printed RFID Antennas", RFID Journal, Jul. 3, 2003, http://www.rfidjournal.com/article/articleprint/288/-1/1, 2 pages.

Rao. K.V.D. et al., "On the Read Zone Analysis of Radio Frequency Identification Systems with Transponders Oriented in Arbitrary Directions." Microwave Conference, 1999, vol. 3; pp. 758-761.

Chichos, S. et al., "Performance Analysis of Polymer Based Antenna-Coils for RFID", Polymers and Adhesives in Microelectronics and Photonics, 2nd International IEEE Conference, 2002, 120-12.

Marrocco, G. et al., "Evolutionary Design of Miniaturized Meander-Line Antennas for RFID Applications", Antennas and Propagation Society International Symposium, IEEE, 2002, 2, 362-3.

RFID, Inc., "RFID Frequencies Tutorial", Mar. 2006, www.rfidinc.com/tutorial.html, 3 pgs.

* cited by examiner

SECONDARY CARD READER

CROSS REFERENCE TO RELATED APPLICATIONS

This application claims the benefit of provisional application 60/537,536, filed Jan. 20, 2004; the inventors of which are, Peter J. Kuzma and Charles A. Eldering, entitled Secondary Card Reader.

BACKGROUND OF THE INVENTION

Radio frequency identification (RFID) is an emerging technology in which transponder devices, also referred to as "tags," can be read by a radio frequency signal. RFID has a wide variety of potential applications in which identification of objects or persons is desirable for tracking and/or controlling access. A principal advantage of RFID systems is that tags can be read without making physical or electrical contact to the tag. This is possible because the system is based on either inductive or electromagnetic coupling of a signal to the tag. This allows items to be read by illumination from an RFID reader.

Because RFID tags can be read without contact, it is possible for them to be read without knowledge of the tag holder. Current systems assume that because the reader will only power up the chip from a few inches away that the cardholder must present the card to the reader. However, other than this assumption, the system offers no specific way for the user to know when their card is powered up and read, and, in many applications the tag may be read from a greater distance thus making it difficult for a cardholder to know the card has been read. Also, it is possible for a tag to be illuminated by a first reader but not properly read by that reader.

In some applications, merchandise tracking and stocking for example, a number of RFID tags may form a group of tags that usefully relate to each other. These tags may be periodically read by one or more primary readers. It may be useful in certain instances for the RFID tag user to collect information about these readings. However, the information collected by these primary readers may not be easily combined if these primary readers are linked to distinct systems. Also, users of the RFID tags may be distinct from users of one or more of the primary readers.

For at least the foregoing reasons, there is a need for a secondary reading device and system that can detect and collect information about readings of one or more RFID tags by one or more primary readers.

SUMMARY OF THE INVENTION

Some embodiments relate to a secondary reader that obtains information about a reading of an RFID tag by a primary reader by receiving an RFID signal that is responsive to a signal from the primary reader. Certain embodiments include an indicator to indicate that the RFID tag has been read. Certain embodiments store information about the reading of the RFID tag at the secondary reader. Certain embodiments communicate information about the reading of the RFID tag to one or more devices, some of which may be external to the secondary reader. In certain embodiments, the secondary reader also receives an interrogation signal from the primary reader. In certain embodiments, the secondary reader receives information related to the primary reader that may, in some instances, include a security key used to determine whether or not the primary reader is authorized to read the RFID tag. Some embodiments relate to a system including both a primary and secondary reader of an RFID tag. In some embodiments, information obtained by the primary reader and the secondary reader from the RFID signal is communicated over a network and compared to determine whether the information obtained matches. In some embodiments, the primary reader sends a confirm signal after it attempts to read an RFID tag and the confirm signal is received by the secondary reader to obtain information about the reading of the RFID tag by the primary reader. In certain other embodiments, a confirm signal is sent by the primary reader only if the primary reader reads the RFID tag successfully. Variations on these and other embodiments are described more fully below.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION OF THE EXEMPLARY EMBODIMENTS

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
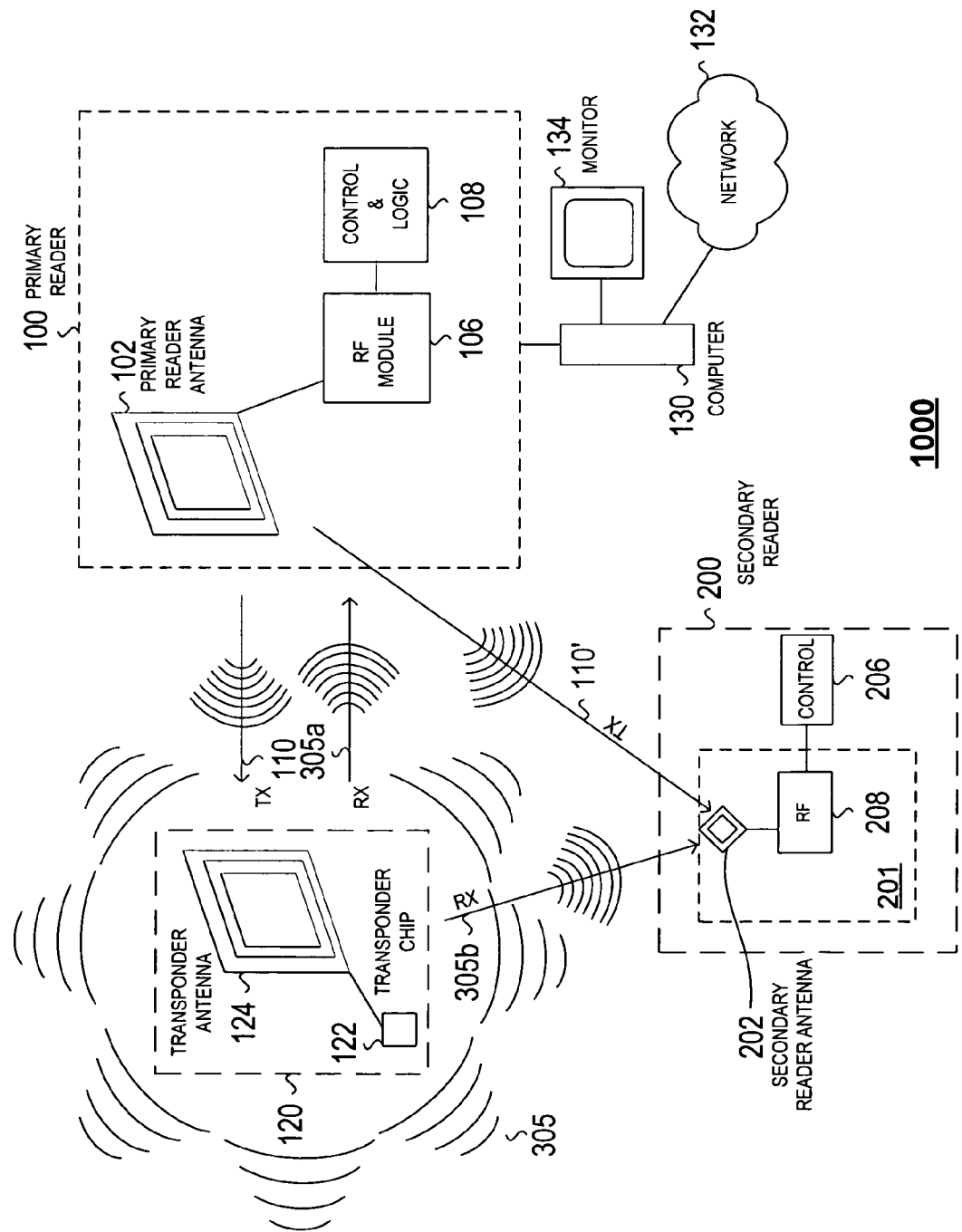
FIG. 1 illustrates an exemplary RFID system in which certain embodiments of the present invention may be implemented.

FIG. 1 illustrates an exemplary RFID system 1000 in which certain embodiments of the present invention may be implemented. System 1000 includes primary reader 100, RFID tag 120, and secondary reader 200. Primary reader 100 includes an antenna 102, an RF module 106 and control logic module 108. Reader 100 is coupled to computer 130 and, via computer 130, reader 100 is also coupled to display monitor 134 and network 132. RFID tag 120 includes transponder antenna 124 and transponder chip 122. RFID tag 120 may be any device adapted to transmit identification information to one or more tag readers over a frequency range suitable for contactless communication. Such tags and associated readers may include devices operating at a wide range of frequencies. The specific range will vary depending on particular applications and may also be chosen to meet (or not meet) applicable RFID standards. Secondary reader 200 includes a secondary receiver 201 and control logic 206. Secondary receiver 201 includes antenna 202 coupled to RF module 208. The term "secondary" is generally used in the description herein as a label indicating components that are part of a reader other than the primary reader.

Considering the operation of system 1000 in the illustrated example, primary reader 100 transmits an interrogation signal 110 through primary reader antenna 102. Note that, in other examples, one or more separate transmission antennas may be used to send the interrogation signal. Furthermore, in other examples, there may be more than one primary receive antenna as part of the primary reader. Interrogation signal 110 as illustrated represents a portion of a field emitted by primary reader 100 that may be received at the transponder antenna 124 of RFID tag 120. Similarly, signal 110' represents another portion of the field emitted by the primary reader, the signal 110' portion being received at secondary reader 200 through secondary antenna 202. For purposes herein, signals such as signals 110 and 110' are sometimes referred to as being the same signal (e.g. "the primary reader signal" or the "interrogation signal") because they result from the same emission even though the signal field, taken at a particular time, might be somewhat different at the RFID tag than at the secondary reader.

Although secondary reader 200 is shown in a particular arrangement with respect to reader 100 and RFID tag 120, the system can operate in a large variety of configurations. For example, secondary reader 200 may be placed directly behind RFID tag 120, forming a collinear arrangement. Alternatively, a secondary reader 200 can be placed in close proximity to reader 100.

Continuing with the operation of system 1000, in response to signal 110, transponder chip 122 operates together with antenna 124 to modulate the interrogation signal. Field 305 represents the resulting field radiated from transponder antenna 124. In other examples, the resulting modulated backscatter field radiated from such a transponder antenna may have somewhat more directivity than the illustrated field 305; the illustration is merely an example. Signal 305a represents the portion of field 305 received at primary reader antenna 102. RF module 106 processes the received backscatter signal and, operating in conjunction with control logic 108, communicates relevant information about the reading to computer 130. Computer 130 may display relevant selected information on monitor 134 and/or transmit such information to network 132, which may or may not be a wireless network.

In the illustrated example, the components of secondary reader 200 are housed separately from the components of primary reader 100. Also, in the illustrated example, secondary reader 200 maintains a physical position that is generally nearer to RFID tag 120 than the position maintained by primary reader 100. For example, primary reader 100 may be moved away from RFID tag 120 as it used to read many different RFID tags. As a related example, primary reader 100 may have a relatively fixed position but RFID tag 120 and other RFID tags may move into and out of a reading range of primary reader 100.

Secondary reader 200 receives signal 305b through secondary receiver 201. Signal 305b represents the portion of field 305 (modulated by transponder 122) received at secondary reader antenna 202. Note that, in parallel to the discussion above regarding signals such as signals 110 and 110', for purposes herein, signals such as signals 305a and 305b are sometimes referred to as being the same signal (e.g. "the RFID signal") because they result from the same field modulation triggered at the RFID tag even though the modulated signal field, taken at a particular time, might be somewhat different at the primary reader than at the secondary reader. As previously described, in this example secondary reader 200 may be adapted to also receive primary reader interrogation signal 110'. RF module 208 receives the respective signals (110' and 305b) via antenna 202 and processes them for use by control logic 206 and other portions of secondary reader 200 as further illustrated in FIG. 2.

Figure 2:
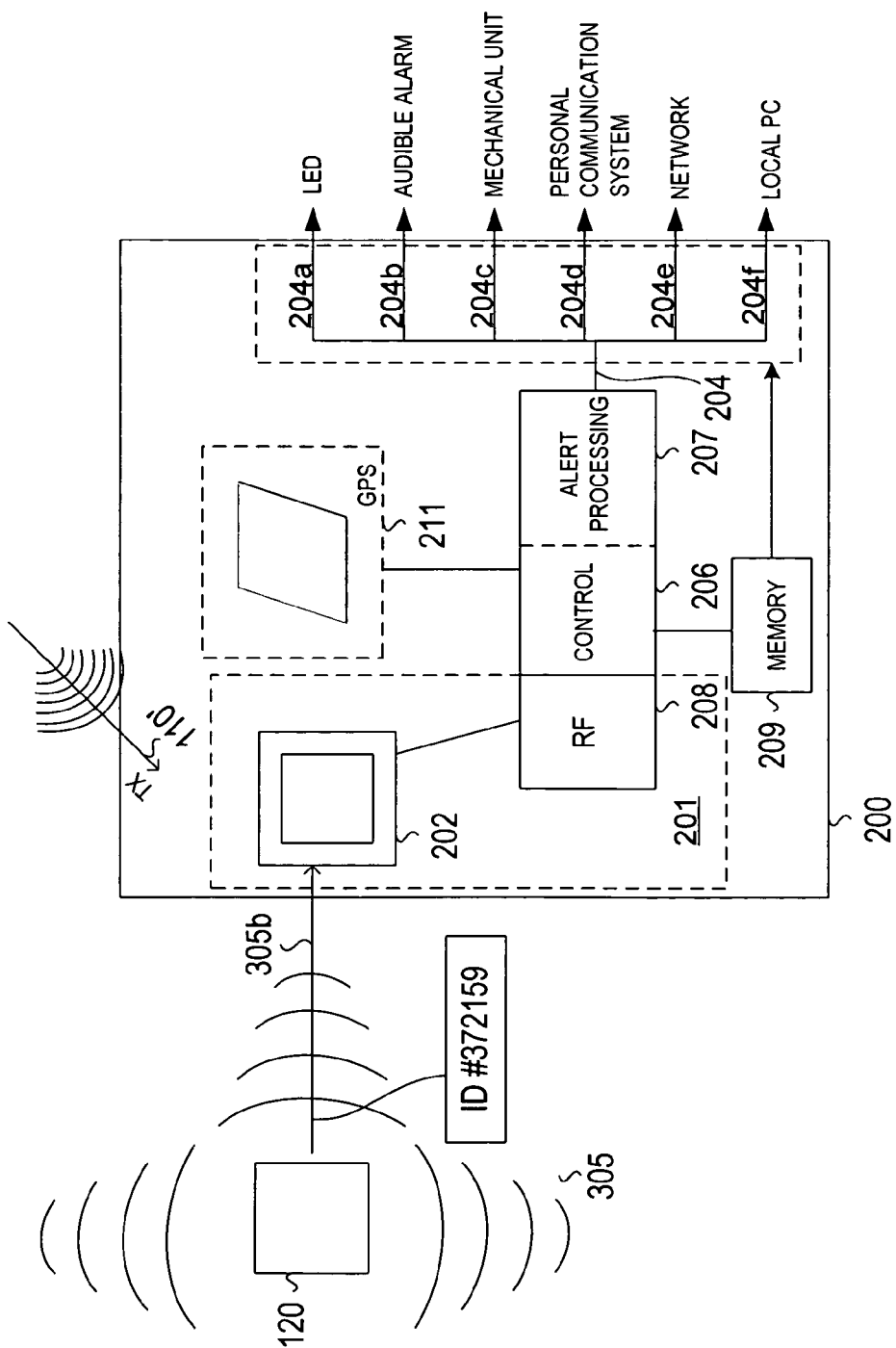
FIG. 2 illustrates further details of the secondary reader of the system of FIG. 1.

FIG. 2 illustrates further details of secondary reader 200. As illustrated, secondary reader 200 further includes alert processing module 207, communication link 204, memory 209, and GPS module 211. Those skilled in the art will realize that portions of the modules illustrated may be implemented in either hardware, firmware, software, or combinations thereof. Furthermore, the diagram does not necessarily represent a particular spatial or electrical organization of or boundaries between relevant processing circuitry. Rather the diagram merely illustrates elements from a general system perspective. Those skilled in the art will realize that a variety of known processing structures can be combined in a variety of ways implement the represented system.

Alert processing module 207 together with communication link 204 provide an indicator coupled to receiver 201 for conveying information about the reading of RFID tag 120. As an example, signal 305b might communicate an identification signal that identifies RFID tag 120, and by implication may identify an object or person associated with that tag. Based on information in received signal 305b, alert processing module 207 provides information to communication link 204. Communication link 204 includes links 204a, 204b, 204c, 204d, 204e, and 204f, which may be selectively coupled for communication with, respectively, an LED, an audible alarm, a mechanical (e.g. vibrating) unit, a personal communication system (e.g. a PDA, wireless phone, or other such device), a network, and a local PC. The signaling complexity and the depth of the information provided through link 204 may vary depending on the particular device receiving the communication. For example, interfaces 204a, 204b, 204c, may provide a simple on/off signal within certain current or voltage ranges to initiate an LED blink, an alarm beep, or a vibration upon receipt by secondary reader 200 of signal 305b. In this instance, the information conveyed is simply a notification that a reading of RFID tag 120 by a primary reader has occurred. On the other hand, the information conveyed through links 204d, 204e, and 204f might, in a particular example, be more involved. As one example, secondary reader might use these links to communicate not only that RFID tag 120 has been read by a primary reader, but also information about the identity of the primary reader that has read the tag and the number of times the tag has been read by that reader or other readers. This information associated with the primary reader may, in some applications, be received by the secondary reader directly via signal 110'. In other examples, GPS module 211 might by utilized to provide the location of secondary reader 200 at the time RFID tag 120 is read by a primary reader. In other alternatives, a GPS module might be included in or connected to the RFID tag itself and information about the location of the RFID tag at the time of reading might be conveyed to a secondary reader for storage at the secondary reader and/or communication through one or more communication links.

In the illustrated embodiment, communication link 204 includes multiple device interfaces 204a-204f. However, those skilled in the art will appreciate that alternatives might provide a more generalized communication link at the secondary reader itself. In such alternatives, individual interfaces to the secondary reader communication link might be provided within the devices receiving information from the secondary reader (e.g. a PC or a PDA).

As will be appreciated by those skilled in the art, the various alert devices referenced may be separate units from a secondary reader such as secondary reader 200 or may be integrated with the secondary reader. For example, an LED, vibration element, and/or audible alarm might be provided as part of the same physical unit as secondary reader 200 or may be provided in separate units coupled to secondary reader 200. As another example, secondary reader 200 might be incorporated into a particular device (e.g. a PDA, cell phone, or similar device) that provides the alert. That device may optionally provide other information about readings of the RFID tag.

Memory 209 of secondary reader 200 might be utilized in a variety of ways for particular application. Memory 209 might be used to retain reading information at secondary reader 200 so that it can later be communicated to a device when a particular communication link is active. In other examples, memory 209 might be used to pre-store information about RFID tag 120 so that secondary reader 200 is more readily able to determine when tag 120 is being read by a primary reader. In yet other examples, memory 209 might be used to store one or more keys or tokens associated with a particular primary reader or a group of authorized primary readers so that secondary reader 200 can determine whether a particular primary reader is authorized. In one example, secondary reader 200 receives a key from primary reader 100 through signal 110' (also see FIG. 1) and checks that key against pre-stored information in memory 209. Information regarding the key match or lack thereof may be used to keep counts at memory 209 of authorized and unauthorized readings. Such counts may also be transmitted through communication link 204. Also, information regarding the key match or lack thereof can be used to make determinations as to whether other information carried by either the primary reader signal 110' or the RFID signal 305b should be stored by secondary reader 200 and/or whether such other information (or alert signals based on receipt of such other information) should be transmitted through secondary reader's 200 communication link 204. Many other examples will be apparent for utilization of memory 209. To cite but one other example, multiple locations determined using GPS module 211 corresponding to positions at particular reading times may stored in memory 209 for later retrieval through communication link 204.

Figure 3:
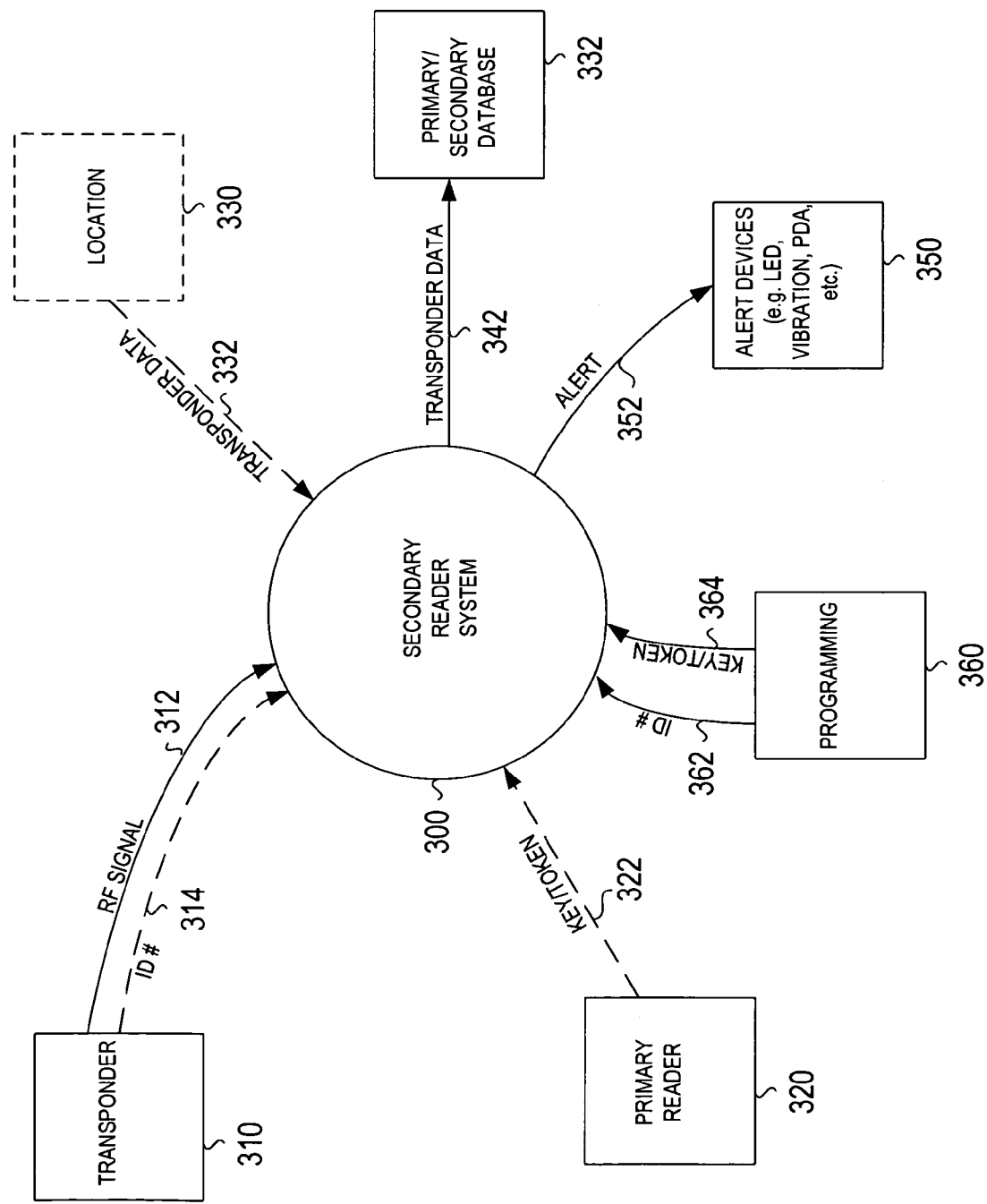
FIG. 3 is a context diagram for an exemplary secondary reader system illustrating how the system interacts with external elements.

FIG. 3 is a context diagram for an exemplary secondary reader system 300, the diagram illustrating how the system interacts with certain elements external to the system. As illustrated in FIG. 3, the transponder unit 310 generates an RF signal 312 which is read by secondary system 300. Signal 312 may carry ID number 314 which is read by secondary reader system 300. Primary reader 320 may optionally generate a key/token 322 which can be transmitted via a primary reader signal and read by secondary system 300.

A programming unit 360 can be connected to secondary reader system 300 and will receive ID number 362, and may also receive a key/token 364. The purpose of transmitting both ID number 362 and key/token 364 into secondary reader system 300 so that the secondary reader system 300 can then look for particular transponders with that ID number and the purpose may also be to allow secondary reader 300 to have some access to keys/tokens which could be emitted by a particular transponder. This allows for the secondary reader system 300 to recognize particular tags and ignore others.

Referring again to FIG. 3, a primary/secondary database 340 receives transponder data 342 from the secondary reader system 300. In one embodiment, transponder data includes all of the data read from the transponder which may have been read by the primary reader 320 and can also be read by the secondary reader 300. As will be discussed, this information can be transmitted to a secondary database 340 or may be transmitted to the primary database 340 being used by the primary reader 320. One or more alert devices 350 may be used to receive alerts 352 indicating that a primary reader 320 has in fact read a particular transponder 310. As shown in FIG. 3, a location module 330 can be used to transmit coordinates 332 to secondary reader system 300 such that the location of the reading of transponder 310 is recorded along with the time of the reading.

Figure 4:
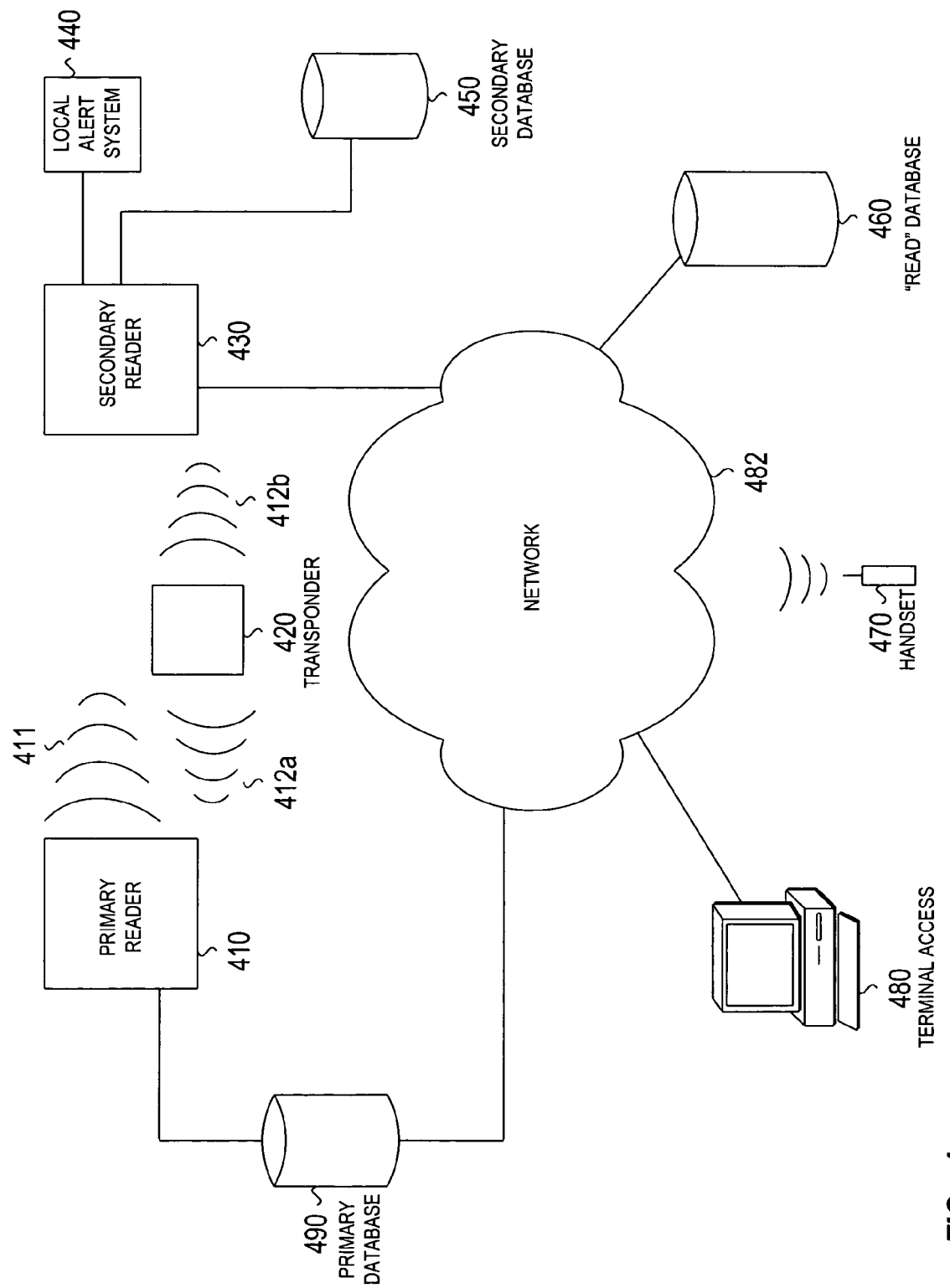
FIG. 4 illustrates use of another exemplary secondary reader in a network environment.

FIG. 4 illustrates use of another exemplary secondary reader 430 in a network environment. In FIG. 4, a primary reader 410 illuminates transponder 420 (an RFID tag) by sending interrogation signal 411. In response, transponder 420 radiates a field that is a modulation of the field emitted from the primary reader 410. A portion of the modulated field is received at primary reader 410 as a signal 412a and another portion is received at secondary reader 430 as signal 412b. Secondary reader 430 reports the reading of the transponder 420 to a local alert system 440 and can also report the reading of the transponder 420 to a secondary database 450. Alternatively, secondary reader 430 can transmit the read information over a network and it may be recorded by primary database 490. In one embodiment, a read of the tag by secondary reader 430 is compared against the read of the tag by primary reader 410 to insure that an accurate read has taken place. In the event that the information read from transponder 420 by primary reader 410 and secondary reader 430 are not the same, a decision can be made as to which information is most likely to be correct or another read of transponder 420 may occur.

Upon reporting the read of transponder 420, secondary reader 430 can transmit that read information to the network 482 such that the information is then stored in a read database 460 which contains all of the occurrences of readings of the transponder 420 as detected by secondary reader 430. Alternatively, a signal can be transmitted through the network to a handset 470 alerting a user that transponder 420 has indeed been read. Primary reader 410 can connect to a terminal 480 through the network 482 for real-time display of reads of the tag.

Figure 5:
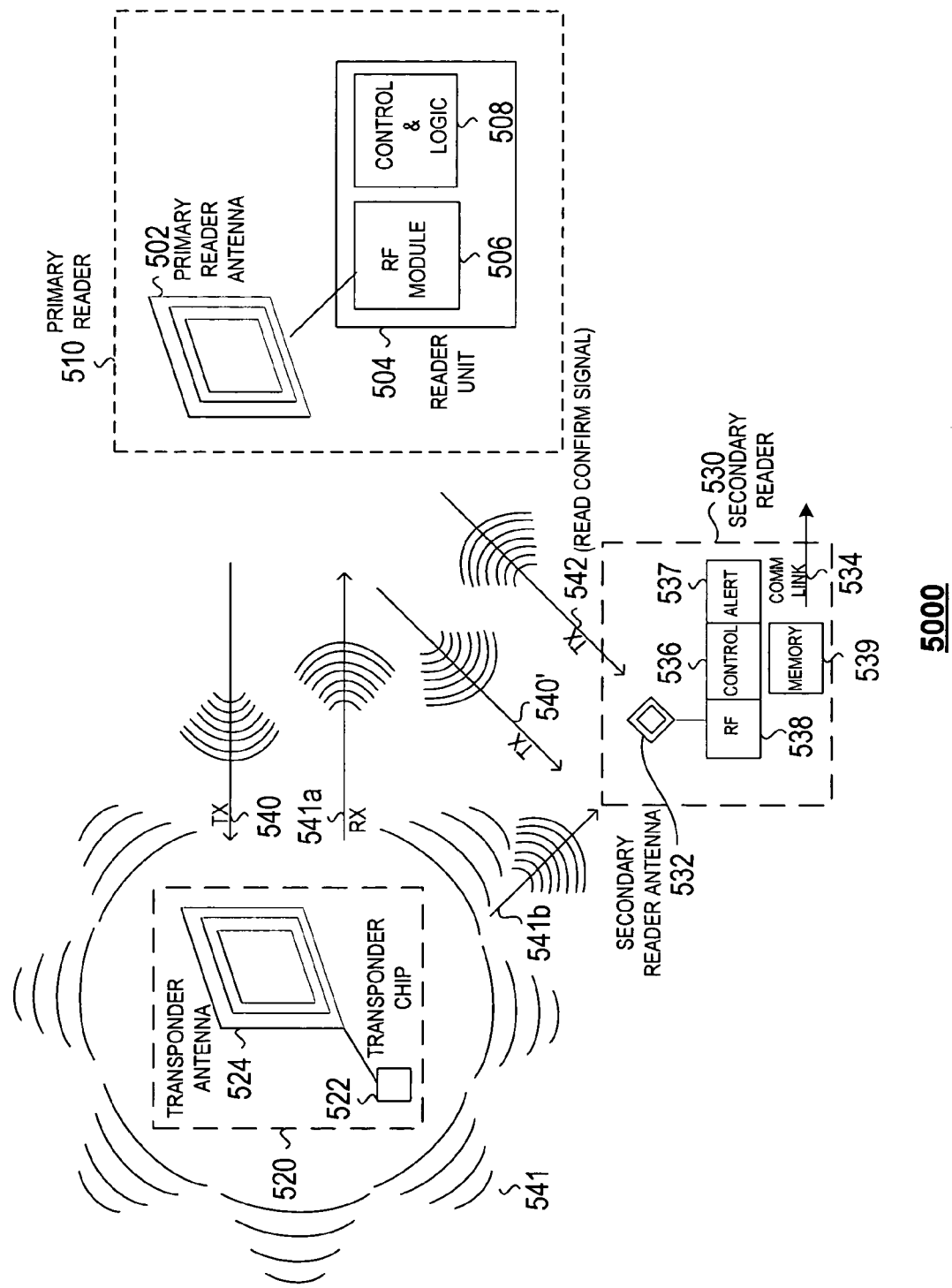
FIG. 5 illustrates an exemplary RFID system in which other embodiments of the present invention might be implemented. The illustrated system includes components adapted to send and receive a read confirm signal.

FIG. 5 illustrates an exemplary RFID system 5000 in which other embodiments of the present invention might be implemented. System 5000 includes components adapted to send and receive a read confirm signal. Specifically, the system 5000 illustrates one alternative to system 1000 illustrated in FIG. 1. System 5000 of FIG. 5 is similar to system 1000 of FIG. 1, except that in system 5000 the primary reader 510 is adapted to send a read confirmation signal to the secondary reader 530 to identify and verify the primary reader's read of the RFID tag 520.

More specifically, system 5000 includes primary reader 510, RFID tag 520, and secondary reader 530. Primary reader 510 includes an antenna 502, an RF module 506 and control logic module 508. RFID tag 520 includes transponder antenna 524 and transponder chip 522. Secondary reader includes antenna 532, RF module 538, control logic 536, alert module 537, memory 539 and communication link 534.

Considering the operation of system 5000 in the illustrated example, primary reader 510 transmits an interrogation signal 540 through primary reader antenna 502. Note that, as previously discussed in the context of primary reader 100 of FIG. 1, in other examples, a separate transmission antenna may be used to send the interrogation signal and/or more than one primary receive antenna may be used to receive backscatter from the RFID tag. Interrogation signal 540 as illustrated represents a portion of a field emitted by primary reader 510 that may be received at the transponder antenna 524 of RFID tag 520. Similarly, signal 540' represents another portion of the field emitted by the primary reader, the signal 540' portion being received at secondary reader 530 through secondary antenna 532. In response to signal 540, transponder chip 520 operates together with antenna 524 to modulate the interrogation signal 540. Field 541 represents the resulting field radiated from transponder antenna 524. Signal 541a represents the portion of field 541 received at primary reader antenna 502. RF module 506 processes the received backscatter signal and, operating in conjunction with control logic 508, stores and/or communicates relevant information about the reading to user interfaces at the primary reader or to devices and/or networks coupled to the primary reader (user interfaces, other devices and networks not separately shown).

Secondary reader 530 receives signal 541b through secondary reader antenna 532. Signal 541b represents the portion of field 541 received at secondary reader antenna 532. Secondary reader 530 also receives signal 540' through secondary reader antenna 532. Signal 540' is received directly from primary reader 510. In contrast to system 1000 of FIG. 1, in system 5000 of FIG. 5, the primary reader 510 emits another signal intended to be received directly by secondary reader 530: read confirm signal 542. Read confirm signal 542 is emitted to confirm for secondary reader 530 the reading of RFID tag 520 by primary reader 510.

In particular applications, use of read confirm signal 542 can reduce or eliminate the need for secondary reader 530 to read other signals, including primary reader signal 540' and modulated backscatter signal 541b. In particular, read confirm signal 542 can be used to transmit to secondary reader 530 confirmation of the reading of tag 520 as well as identification information regarding tag 520 and primary reader 510.

However, in other applications, read confirm signal 542 can be used by secondary reader 530 to provide information that is in addition to that provided by signal 541b. For example, 541b may provide an indication to secondary reader 530 that RFID tag 520 has been read and then signal 542 may be used to provide secondary reader 530 with the identity of the primary reader that has read the signal. Alternatively, or in addition, an authorization key may be provided by primary reader 510 to secondary reader 530, the key indicating that primary reader 510 was in fact authorized to read RFID tag 520. In another respect, in a particular application, the presence of a signal 541b in combination with the absence of any read confirm signal 542 may be used by secondary reader 530 to indicate that an unauthorized reading of RFID tag 520 has occurred. Other variations will be apparent to those skilled in the art in which the flexibility provided by the presence (or expected presence) of a read confirm signal sent by a primary reader to a secondary reader can be utilized.

The system, apparatus and method described herein can be used in a variety of industrial applications. In a first application the secondary reader, which does not have tag illumination capability, is placed in close proximity to the tag and reads of the tags are recorded and indicated to the tag holder. An example of this application is the use of a secondary reader in conjunction with passports that contain RFID tags. In one embodiment the secondary reader is incorporated into the passport holder. As the passport tag is read the secondary reader notes the reading and indicates that reading to the passport owner through an audible or visible alert. In one embodiment the reading of the passport tag is transmitted from the secondary reader and recorded in a database.

In an alternate application the secondary reader, which does not have tag illumination capability, is set up as part of the overall system including the primary reader and tags, but is distinguished from the primary reader in that it does not contain circuitry for illumination but only has one or more receive antennas. In this embodiment the secondary reader also has filtering capability to insure that it only monitors (generates alert signals for or records) the reading of tags of interest.

In one embodiment the secondary reader will filter data and only record/respond to tag data associated with the unique identifiers of the RFID tags of interest. The unique identifiers can be 64 to 128 bit numbers associated with the tags. Some tags will have data stored in addition to the 64-128 bit identifier, but that data will only be recorded or monitored if the tag is known to be of interest to the secondary reader and associated data processing network. A database of relevant tag identifiers and associated data can be stored in the software, hardware, or firmware of the secondary reader, and the database can be modified such that the secondary reader always has a current list of relevant identifiers.

In a store or warehouse environment, the secondary reader and associated data processing network can be used to monitor the reading of particular tags. In this embodiment the system offers the ability to selectively monitor how and where tags are being read as opposed to monitoring the reading of each and every tag.

In the abovementioned applications or other applications the reader may have a plurality of antennas for receiving tag reads at different frequencies such as HF and UHF. Other combinations of antennas can be used for reading tags at different frequencies. Although particular embodiments have been described in detail and certain variants have been noted, various other modifications to the embodiments described herein may be made without departing from the spirit and scope of the present invention, thus, the invention is limited only by the appended claims.

What is claimed is:

1. A method of reading a radio frequency identification ("RFID") tag comprising:
    reading an RFID signal at a primary reader, the RFID signal being from the RFID tag and being in response to a primary reader signal from the primary reader;
    reading an RFID signal at a secondary reader, the RFID signal being from the RFID tag and being in response to the primary reader signal;
    sending information obtained from reading the RFID signal at the primary reader through a primary reader communication link to a device coupled to a network; and
    at the device coupled to the network, comparing the information obtained from reading the RFID signal at the primary reader to information obtained from reading the RFID signal at the secondary reader.

2. The method of claim 1 further comprising:
    using the RFID signal at the secondary reader to indicate that the RFID tag has been read by the primary reader.

3. The method of claim 1 further comprising:
    storing information obtained from the RFID signal at the secondary reader.

4. The method of claim 3 wherein the information obtained and stored includes information relating to an item identified by the RFID tag.

5. The method of claim 3 wherein the information obtained and stored includes a security key.

6. The method of claim 3 wherein the information obtained and stored includes information relating to the primary reader.

7. The method of claim 3 wherein the information obtained is selectively stored depending on whether it includes information matching pre-stored information.

8. The method of claim 1 further comprising:
using information obtained from the RFID signal received at the secondary reader to determine and store a count of instances in which the RFID tag was read by a primary reader.

9. The method of claim 1 wherein the RFID signal at the primary and secondary readers is a modulated reflection of the primary reader signal.

10. The method of claim 1 further comprising receiving and reading information from the primary reader signal at the secondary reader.

11. The method of claim 10 wherein the information read from the primary reader signal relates to the primary reader.

12. The method of claim 11 wherein the information relating to the primary reader includes a security key.

13. The method of claim 10 further comprising storing the information read from the primary reader at the secondary reader.

14. The method of claim 10 further comprising using the information read from the primary reader at the secondary reader to indicate whether a reading of the RFID tag by the primary reader was authorized.

15. The method of claim 1 wherein the device coupled to the network is the secondary reader.

16. The method of claim 1 wherein the information obtained from reading the RFID signal at the secondary reader has been sent from the secondary reader through a secondary reader communication link to the device coupled to the network.

* * * * *